(No Model.)  W. C. COWIE.  5 Sheets—Sheet 3.
VIBRATING PROPELLER.
No. 271,041.  Patented Jan. 23, 1883.
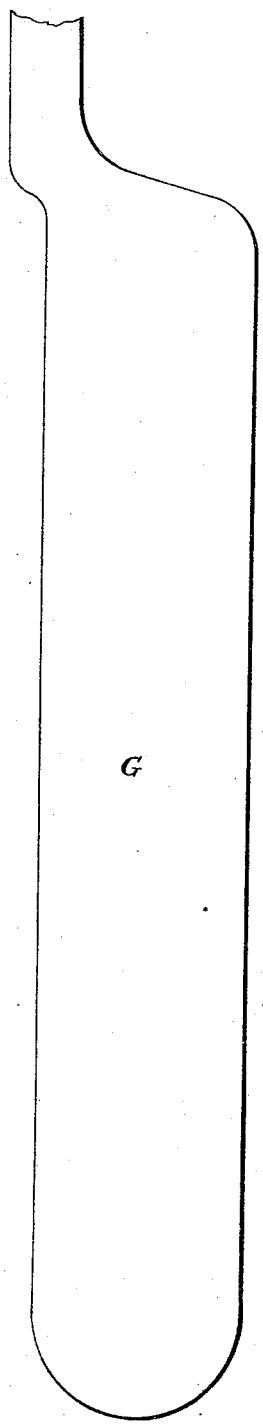
Fig. 4.
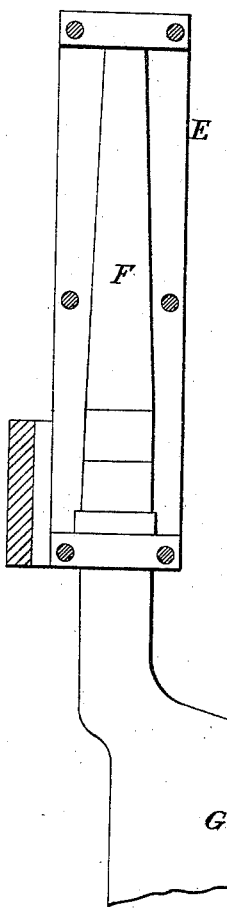
Fig. 5.
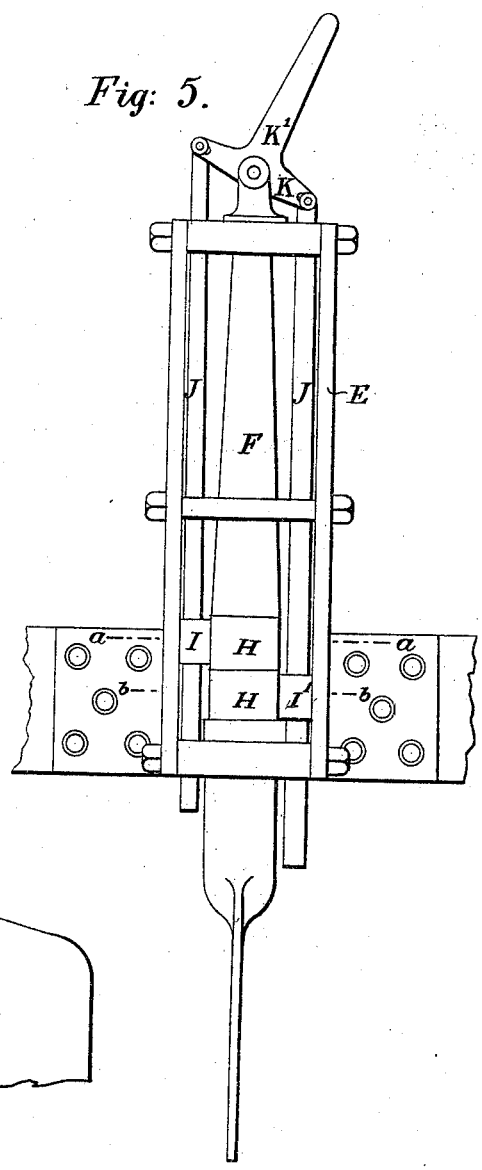
Fig. 6.
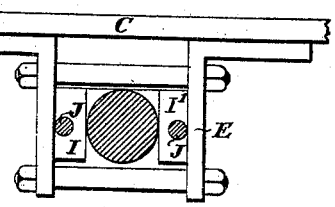

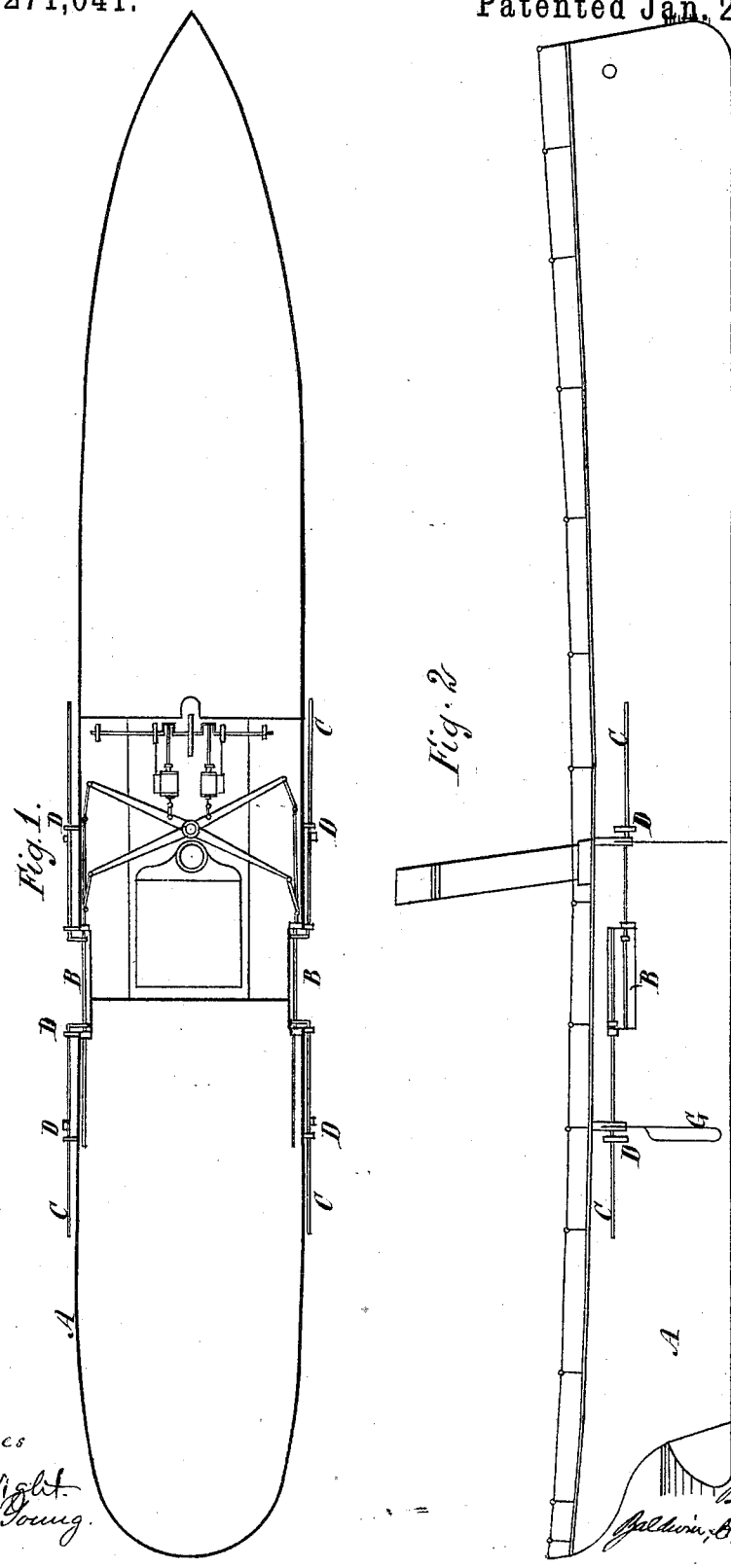

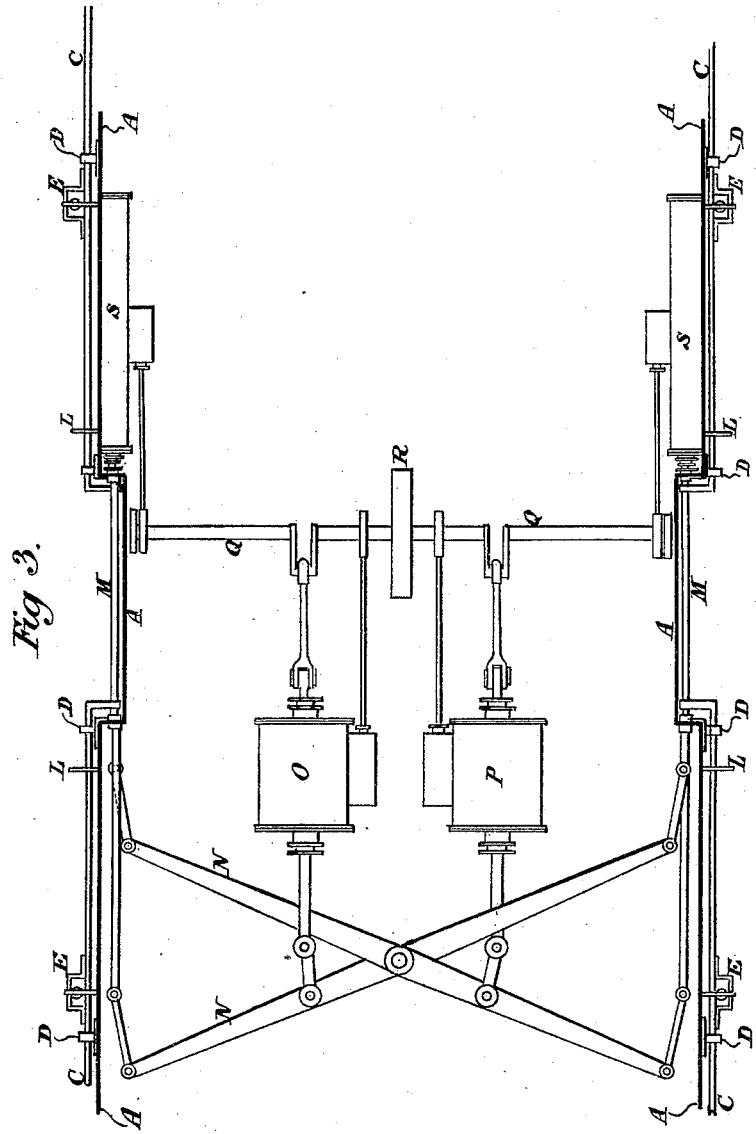

(No Model.)  
5 Sheets—Sheet 4.
W. C. COWIE.
VIBRATING PROPELLER.
No. 271,041.  
Patented Jan. 23, 1883.
Fig: 7.
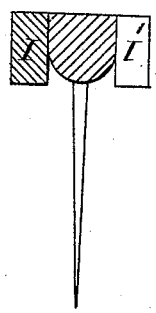
Fig: 7.ˣ
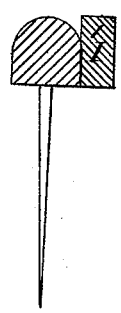
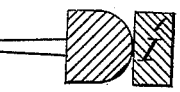
Fig: 8.
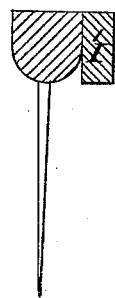
Fig: 8.ˣ
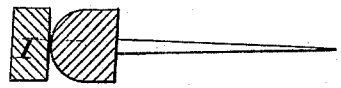
Witnesses  
L. B. Wright  
James Young.
Inventor  
W. C. Cowie,  
By his Attorneys  
Baldwin, Hopkins & Peyton
N. PETERS, Photo-Lithographer, Washington, D. C.

(No Model.)
W. C. COWIE.
VIBRATING PROPELLER.
No. 271,041. Patented Jan. 23, 1883.
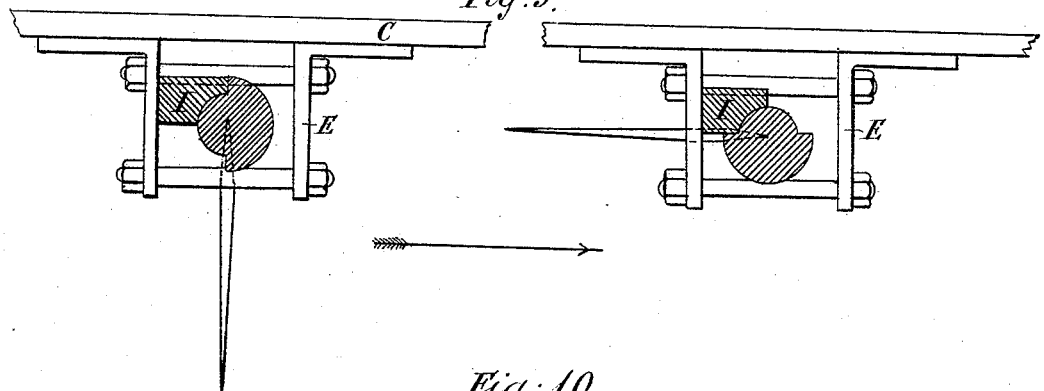
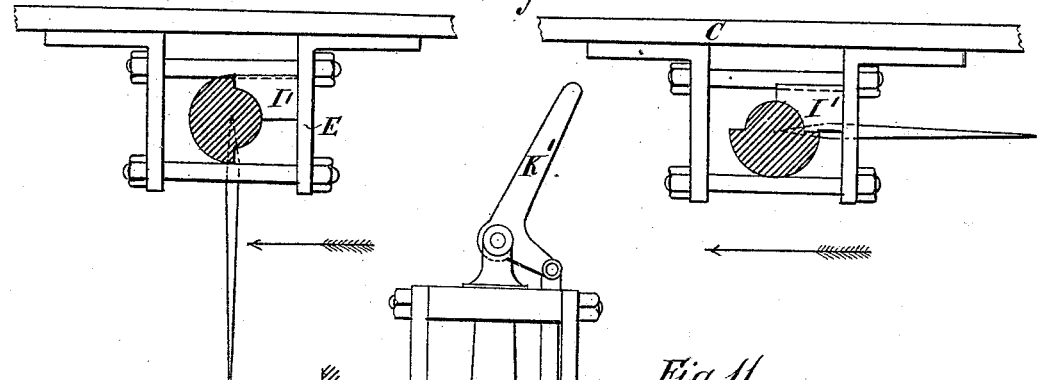
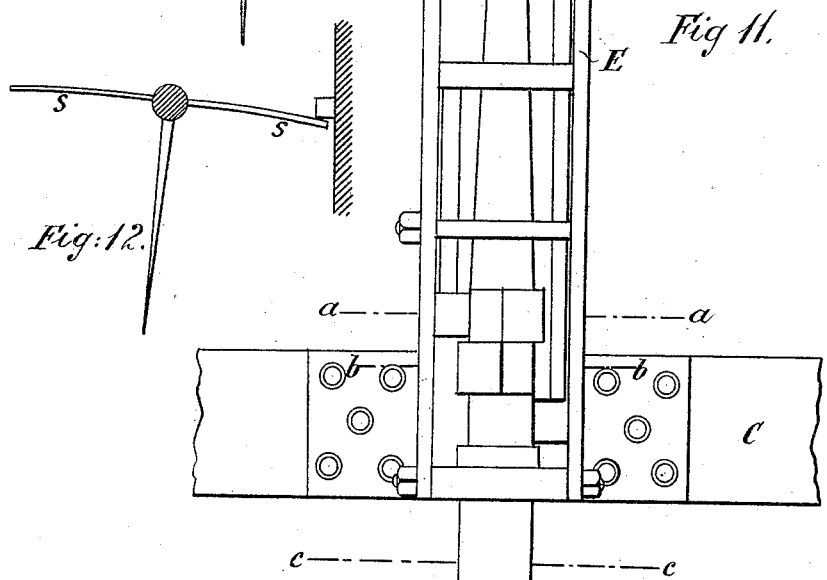
Witnesses.
L. B. Wight
James Young.
Inventor.
W. C. Cowie
By his attorneys
Baldwin, Hopkins & Peyton.

UNITED STATES PATENT OFFICE.

WILLIAM C. COWIE, OF THE COLONY OF LABUAN, BORNEO.

VIBRATING PROPELLER.

SPECIFICATION forming part of Letters Patent No. 271,041, dated January 23, 1883.

Application filed August 14, 1882. (No model.) Patented in England June 22, 1882, No. 2,968.

*To all whom it may concern:*

Be it known that I, WILLIAM CLARK COWIE, a subject of the Queen of Great Britain, of the Colony of Labuan, Borneo, at present residing at the Covent Garden Hotel, in the county of Middlesex, England, have invented certain new and useful Improvements in Propelling Vessels, (for which I have received Letters Patent in Great Britain, No. 2,968, dated 22d day of June, 1882,) of which the following is a specification.

For propelling a vessel I employ vertical propeller-blades similar in form to knife-blades, and of the class which are mounted at the exterior of the sides of the vessel and reciprocated to and fro in a horizontal direction in a line with the vessel's length, and are caused to be set edgewise when moving in the direction that the vessel is to be propelled, and at right angles to the line of the vessel's movement when moving in the contrary direction. The blades are made to extend from above the deep-load water-line nearly to the depth of the keel of the vessel. Above the water-line the top of each blade is secured to a vertical axis. This axis is mounted in bearings in a vertical frame secured near its lower end to a strong horizontal bar which can be moved endwise to and fro horizontally in guides secured to the vessel's side above the deep-load water-line. Preferably I employ on each side of the vessel two such bars, each having secured to them a frame or frames carrying a propeller blade or blades, and one bar I cause to be moved forward while the other is moving backward, so that the blade or blades carried by the one shall be propelling while the blade or blades carried by the other are making their return-stroke and are out of action, and by so doing I equalize the action of the propelling mechanism.

In order to give motion to the bars carrying the propelling-blades, I form a recess on each side of the vessel, preferably near its center, and above the water-line. At each of the two ends of each recess I provide a stuffing-box, through which a horizontal rod parallel with the vessel's length is passed from inside the vessel. The two rods which pass into each recess in the vessel's side are at different elevations, so that they can work to and fro in the recess without interfering with one another. One rod is connected to one of the two bars carrying the propeller-blades and the other to the other bar carrying the other blade or blades. One of the rods on one side of the vessel is connected to one of the rods on the opposite side of the vessel by a horizontal lever within the vessel, which can turn on a center above the line of the vessel's keel, so that one rod shall move forward while the other moves backward. The two other rods are similarly connected by a second lever. One lever is by a link connected to the piston-rod of a horizontal steam-cylinder on one side of the vessel's keel, while the other lever is connected by a link with the piston-rod of another horizontal cylinder on the opposite side of the vessel's keel. The piston-rods of the two cylinders are both connected by connecting-rods to cranks on a crank-shaft on which is a fly-wheel, and also eccentrics for working the valves for the admission and escape of steam to and from the two steam-cylinders. High-pressure cylinders may also, if desired, be placed just inside the vessel in a line with the rods which give motion to the bars which carry the propeller-blades, and the piston-rods of these high-pressure cylinders may be attached to these rods and aid in giving motion to them; or the high-pressure cylinders may be placed alongside of the low-pressure cylinders, and their piston-rods be then connected by links to the same horizontal levers to which the piston-rods of the low-pressure cylinders are connected. By arranging the engines in these ways they occupy but small space in the vessel, being all on one horizontal plane, and that just above the water-line, while the condensers and pumps of the engine may all be below them. If it is desired that the engines should be entirely below the water-line, then the bars carrying the propeller-blades may be driven by vertical bar-arms on axes passing across the vessel. Any suitable arrangement of stops may be employed to allow of the blades on the return-stroke being turned by the pressure of water against them into a line with the vessel's movement, and to allow of the blades turning outward again into a position at right angles to the vessel, but no farther, at the commencement of the acting stroke. To allow of the vessel's being propelled either ahead or astern, the stops also are made movable, and provision is made for moving the stops without arresting the working of the engines. In order to insure that at the commencement of each acting stroke the propeller-blade shall turn outward away from the vessel and not inward toward it, the propeller-blade may at the end of each return-stroke be made to incline slightly outward away from the vessel's side. To effect this two spring-arms may be fixed to the axis of the propeller-blade at right angles to one another. When the vessel is being propelled forward one spring-arm at the end of the return-stroke is made to come against a fixed stop, and so give a slight turn to the axis to turn the blade and make it incline slightly outward away from the vessel's side. The other spring-arm acts in a similar manner when the vessel is being propelled astern.

Figure 1 of the drawings hereunto annexed shows a plan view, and Fig. 2 a side elevation, of a vessel fitted with propelling mechanism constructed as above described. Fig. 3 shows, on a larger scale, a plan view of the propelling mechanism. Figs. 4 and 5 show separately, on a larger scale, one of the frames which carry the vertical axis of the propelling-blades. Fig. 6 is a cross-section of the same. Figs. 7 and $7^\times$ are diagrams showing how the positions of the propeller-blades are controlled by stops when the vessel is being propelled ahead. The sections Fig. 7 are taken through the line $a$ $a$, Fig. 5, and the sections Fig. $7^\times$ through the line $b$ $b$. Figs. 8 and $8^\times$ are similar views, showing the position of the stops when the vessel is being propelled astern. Figs. 9 and 10 show how the construction of the stops may be modified. Fig. 11 shows how the stops shown at Figs. 9 and 10 may be simultaneously raised or lowered. Fig. 12 shows one of the propeller-blades with spring-arms, to insure its turning in the right direction.

A A are the sides of the vessel. B is a recess formed in each side. C C are two horizontal bars on each side of the vessel at different levels—one higher than the other—and at equal distances from the vessel's side. They are carried in bearings D D, which are fixed to the sides of the vessel. The bearings allow the bars to be moved endwise to and fro lengthwise of the vessel and above the water-line. One of the bars C on each side of the vessel is in front of the recess B and the other in rear of this recess. Each bar has fixed to it a rectangular frame, E. (Shown separately on a larger scale at Figs. 4 and 5 and in horizontal cross-section at Fig. 6.) The frames are located above the water-line, so as to be readily accessible and avoid the expenditure of power which would be required to reciprocate them through the water. In each frame is mounted a vertical axis, F. The axis extends down below the bottom of the frame, and carries a knife-like blade, G. On the axis F are two short arms, H, standing out radially from it in opposite directions. The frame carries two stops, I I′, opposite to these arms—one on one side of the axis and the other on the opposite side. The stops are fixed to vertical rods J, by which they can be moved up or down, and the rods at their upper end are connected to the opposite arms of a lever, K. By a third lever-arm, K′, the lever K can be rocked on its axis, and the stops thereby moved in opposite directions, so that when one of the stops is on a level with the upper arm on the axis F the other stop is on a level with the bottom arm, and vice versa, and when the stops are in the one position the vessel will be propelled ahead, and when they are in the other position the vessel will be propelled astern.

The diagrams Figs. 7 and $7^\times$ show the position and action of the stops when the vessel is being propelled ahead, and the diagrams Figs. 8 and $8^\times$ show the position and action of the stops when the vessel is being propelled astern. The arrows show the direction in which the vessel would be propelled by the propelling-blade.

In order that the vessel may be propelled either ahead or astern at pleasure, I provide stop-pins L L, which are passed through stuffing-boxes in the vessel's side in such a position that if either of them is protruded from the vessel the lever-arm K′ may come against it just before the bar completes its stroke in one or other direction, so that by protruding either one or other pin the arm K′ can be set to incline either forward or backward, and thus the stops can be brought into either of their two positions, as desired.

To insure that at the commencement of each acting stroke the propeller-blade shall turn outward away from the vessel, the axis of the propeller-blade may, as above stated, have two spring-arms, $s$, secured radially to it upon opposite sides, as shown at Fig. 12. They may be secured to the axes, say, upon the line $c$ $c$, Fig. 11. Just at the completion of each backward stroke one of the spring-arms would strike against a stop on the vessel's side, and would cause the blade to turn slightly outward. One spring-arm would act in this way when the vessel was being propelled in one direction and the other when the vessel was being propelled in the other direction.

In place of the stops being formed in the manner shown by the diagrams Figs. 7 and 8, they might be formed as shown by the diagrams Figs. 9 and 10. In this case one stop would be out of action when the other was in action, and both stops would have to be either raised simultaneously or lowered simultaneously when the direction of propulsion is to be reversed.

Fig. 11 shows how the simultaneous raising or lowering of the two stops may be effected by a lever, as in the former arrangement.

Figs. 9 are sections taken through the line $a$ $a$, Fig. 11, showing the two positions of the blade when the vessel is being propelled ahead; and Figs. 10 are sections taken through the line $b$ $b$, Fig. 11, showing the positions of the blade when the vessel is being propelled astern, the stops I I′ having then been raised.

The way in which a to-and-fro motion is given to the bars C is shown at Fig. 3. Each bar at its end which is next to the recess B is attached to a rod, M, which passes through stuffing-boxes at the two ends of the recess B. There are two such rods on each side of the vessel, one above the other, as shown at Fig. 2. One is attached to one bar, the other to the other bar. One end of each rod is attached to one arm of a lever or beam, N, which turns on an axis above the line of the keel. The other arms of the two beams or levers N are on the opposite side of the vessel similarly attached to the rods M, which are on that side of the vessel. One beam or lever is coupled to the piston-rod of a steam-cylinder, O, the other to the piston-rod of a steam-cylinder, P. The piston-rods of these cylinders are by connecting-rods also coupled to cranks on a crank-shaft, Q, on which is a fly-wheel, R, and also eccentrics for working the slide-valves of the steam-cylinders. The rods M might also, as shown, be attached to the piston-rods of steam-cylinders S, and these cylinders might serve as high-pressure cylinders, and the steam might be expanded from them into the other cylinders; or high-pressure cylinders might be placed alongside of or at the ends of the other cylinders.

Having thus described the nature of my invention and the manner of performing the same, I would have it understood that I claim—

1. The combination, with the vessel, of the reciprocating bars at the sides thereof above the water-line, the frames fixed to said bars and working above the water-line, the propeller-blades, their vertical axes mounted in the frames, and the adjustable stops acting on the axes of the propeller-blades, all substantially as and for the purpose hereinbefore set forth.

2. The combination, with the vessel, of the reciprocating bars, arranged in pairs at its opposite sides, at different levels, and equidistant from the vessel's side, the frames fixed to the bars above the water-line, and the propeller-blades mounted by their vertical axes in the frames, substantially as and for the purpose hereinbefore set forth.

3. The combination, with the vessel, of the reciprocating bars at its sides, the frames, the propeller-blades, their vertical axes, the adjustable stops acting on the axes of the propeller-blades, the rods and levers for adjusting the stops, and the adjustable stop-pins L at the sides of the vessel, substantially as and for the purpose hereinbefore set forth.

4. The combination of the two pairs of reciprocating bars at the sides of the vessel, the propeller-blades mounted by their vertical axes in frames reciprocating with said bars, the pairs of reciprocating rods M, to which the bars are attached, the pair of centrally-pivoted levers with the ends of which the rods are connected, the two steam-cylinders and their piston-rods, connected respectively with the pivoted levers, substantially as and for the purpose hereinbefore set forth.

WILLIAM CLARK COWIE.

Witnesses:
J. WATT,
JNO. DEAN,
  *Both of 17 Gracechurch Street, London.*